US007069695B2

(12) United States Patent
Hattori et al.

(10) Patent No.: US 7,069,695 B2
(45) Date of Patent: Jul. 4, 2006

(54) AUTOMATICALLY OPENING/CLOSING APPARATUS FOR VEHICLE

(75) Inventors: Takeshi Hattori, Wako (JP); Tomofumi Ichinose, Wako (JP); Yoshitomo Ihashi, Wako (JP); Toshihisa Omori, Wako (JP); Yasushi Yoshida, Kiryu (JP)

(73) Assignees: Honda Motor Co., Ltd., Tokyo (JP); Mitsuba Corporation, Gunma (JP)

( * ) Notice: Subject to any disclaimer, the term of this patent is extended or adjusted under 35 U.S.C. 154(b) by 0 days.

(21) Appl. No.: 10/962,351

(22) Filed: Oct. 8, 2004

(65) Prior Publication Data

US 2005/0076571 A1 Apr. 14, 2005

(30) Foreign Application Priority Data

Oct. 9, 2003 (JP) ............................ 2003-350566

(51) Int. Cl.
*E05F 11/24* (2006.01)
*F16H 27/02* (2006.01)
*F16H 1/04* (2006.01)

(52) U.S. Cl. ......................... 49/341; 49/339; 74/89.11; 74/422; 296/146.8; 296/146.4; 296/56

(58) Field of Classification Search .................. 49/341, 49/342, 339, 340, 324, 336, 335; 74/89.11, 74/89.12, 89.16, 89.17, 422; 296/146.8, 296/146.4, 56, 106

See application file for complete search history.

(56) References Cited

U.S. PATENT DOCUMENTS 6,378,392 B1 4/2002 Dombrowski et al. ........ 74/422
6,382,706 B1 * 5/2002 Yuge et al. .............. 296/146.4
6,513,859 B1 * 2/2003 Yuge ........................ 296/146.4
6,767,048 B1 * 7/2004 Yokota ..................... 296/146.4
6,776,443 B1 * 8/2004 Shimura et al. .............. 296/56
6,799,790 B1 * 10/2004 Sakai et al. .............. 296/146.8
6,834,463 B1 * 12/2004 Fukumoto et al. ............ 49/341
6,871,449 B1 * 3/2005 Ihashi .......................... 49/339
6,891,344 B1 * 5/2005 Sakai et al. .............. 296/146.8
6,929,310 B1 * 8/2005 Okada ...................... 296/146.8

FOREIGN PATENT DOCUMENTS

JP 2000-264067 9/2000
JP 2001-253241 9/2001
JP 2001-280000 10/2001
JP 2001280000 10/2001

* cited by examiner

*Primary Examiner*—Hugh B. Thompson, II
(74) *Attorney, Agent, or Firm*—McCormick, Paulding & Huber LLP

(57) ABSTRACT

An automatically opening/closing apparatus for vehicle of rack-and-pinion type is reduced in size and weight. The automatically opening/closing apparatus for vehicle is automatically opened/closed, by transmitting rotation of an electric motor to a back door through a drive power transmitting mechanism comprising a pinion and a rack. The rack is supported linearly reciprocably by a slide mechanism comprising a slide block and a guide rail. The slide block is formed to be sufficiently short to the entire length of the rack and the guide rail is accordingly formed to be short. Further, the rack is provided with a groove portion, and a holding member contacting with a holding face is disposed in the groove portion. Then, an interval between the rack and the opinion is maintained by the holding member, whereby engagement of the pinion therewith is ensured.

4 Claims, 12 Drawing Sheets

AUTOMATICALLY OPENING/CLOSING APPARATUS FOR VEHICLE

CROSS-REFERENCE TO RELATED APPLICATION

Applicants hereby claim foreign priority benefits under U.S.C. § 119 from Japanese Patent Application No. 2003-350566, filed on Oct. 9, 2003, the content of which is incorporated by reference herein.

BACKGROUND OF THE INVENTION

The present invention relates to an automatically opening/closing apparatus for vehicle, which automatically opens and closes an opening/closing member mounted on a vehicle body and more particularly to a rack-and-pinion type one that has a pinion rotate-driven by a drive source and a rack engaged with the pinion.

Conventionally, throughout a vehicle such as an automobile, an opening/closing member openably and closably mounted on the vehicle, such as a door, a trunk lid, and a back door, has been provided. Particularly, a station wagon, a one-box car, or the like is provided in many cases with a back door at a rear end of the vehicle so as to facilitate loading and unloading of baggage from a rear side of the vehicle. Usually, this kind of back door is mounted on the vehicle body through a hinge fixed to a rear end of a vehicle roof with a supporting point for rotation being substantially horizontal, thereby being opened and closed vertically around the supporting point for rotation of the hinge, which serves as its center. In this case, the back door is also called a lift gate or rear hatch or the like since it is largely swung in an upper direction of the vehicle.

However, since such a back door is large and heavy in most cases, there is the problem that women or children cannot particularly open or close the back door easily. Specifically, when it is opened fully, the back door is largely swung upward and therefore it is more difficult to close the door.

For this reason, under the condition of increase in family use of a one-box car or the like, a vehicle equipped with an automatically opening/closing apparatus that automatically opens/closes the back door has been developed so that even women and children can easily open and close. Because such an automatically opening/closing apparatus allows the back door to be controlled remotely from a driver's seat, demands for installation of the automatically opening/closing apparatus are frequently made due to such convenience.

As such an automatically opening/closing apparatus, a so-called rack-and-pinion type one, which comprises a pinion driven by a driving unit serving as an electric motor and a rack having rack teeth each engaged with this pinion, has been well known in, for example, Japanese Patent Laid-open No. 2001-253241. In this case, the rack is formed into a stick shape, and is connected to the back door through a connecting rod and concurrently accommodated in a channel to be supported in a linearly reciprocable manner by the channel. Then, if the pinion is rotate-driven by the electric motor, a linear reciprocation of the rack is transmitted to the back door through the connecting rod, whereby the opening/closing operation of the back door is performed.

Further, as such a rack-and-pinion type of automatically opening/closing apparatus, there has been well known a so-called outer rack type one in which an outer rack formed substantially into a "C" shape in sectional view is mounted outside a guide rail in a linearly reciprocable manner.

SUMMARY OF THE INVENTION

However, in such a rack-and-pinion type of automatically opening/closing apparatus, the channel and the guide rail need to be supported throughout the entire operating range of the rack. Thus, the guide rail is formed to become substantially twice as long as the entire length of the rack in dimension, whereby the automatically opening/closing apparatus for vehicle grows in size and gets heavy.

Further, in the outer rack type of automatically opening/closing apparatus, the rack is formed so as to have a C-shaped section throughout the entire length by an undercut processing etc. However, such a processing is very difficult to perform.

An object of the present invention is to reduce in size and weight an automatically opening/closing apparatus for rack-and-pinion type vehicle.

A automatically opening/closing apparatus for vehicle according to the present invention, which has a rack connected to an opening/closing member mounted on a vehicle and a drive source for rotate-driving a pinion engaged with rack teeth of said rack so as to automatically open/close said opening/closing member, comprises: a slide mechanism including a slide portion provided on a side of an axial-direction end of said rack and a guide member engaged with said slide portion and thereby supporting linearly reciprocably said rack; and a holding member contacting with a holding face of said rack, which is formed on a rear side with respect to said rack teeth, and thereby maintaining an interval between said rack and said pinion.

In the automatically opening/closing apparatus for vehicle according to the present invention, a plurality of said holding members are each arranged along said holding face with a predetermined space.

The automatically opening/closing apparatus for vehicle according to the present invention further comprises an elastic member mounted on said the holding member and biasing said rack in a direction away from said pinion.

According to the present invention, since the length dimension of the slide member guided by the guide member can be reduced, the automatically opening/closing apparatus for vehicle can be reduced in size and weight.

Also, according to the present invention, since the length dimension of the guide member, which constitutes the slide mechanism for supporting linearly reciprocably the rack, can be reduced to a degree of the length dimension of the rack, the automatically opening/closing apparatus for vehicle can be reduced in size and weight.

Further, according to the present invention, since the interval between the rack and the pinion is held at an interval suitable for the engagement thereof by the holding member, the engagement of the rack and the pinion can be stabilized. Therefore, noise, and vibration, etc. generated during the actuation of the automatically opening/closing apparatus for vehicle can be reduced.

Further, according to the present invention, since the slide member, the rack, and the guide member, etc. can be modified easily depending on each specification, the general-purpose characteristics of the automatically opening/closing apparatus for vehicle can be improved.

Additionally, according to the present invention, by providing a plurality of holding members, torsion etc. of the rack can be suppressed even if a large load is applied from the opening/closing member. Therefore, noise, and vibration, etc. generated during the actuation of the automatically opening/closing apparatus for vehicle can be further reduced.

DESCRIPTION OF THE PREFERRED EMBODIMENTS

Hereinafter, an embodiment of the present invention will be detailed based on the drawings.

Figure 1:
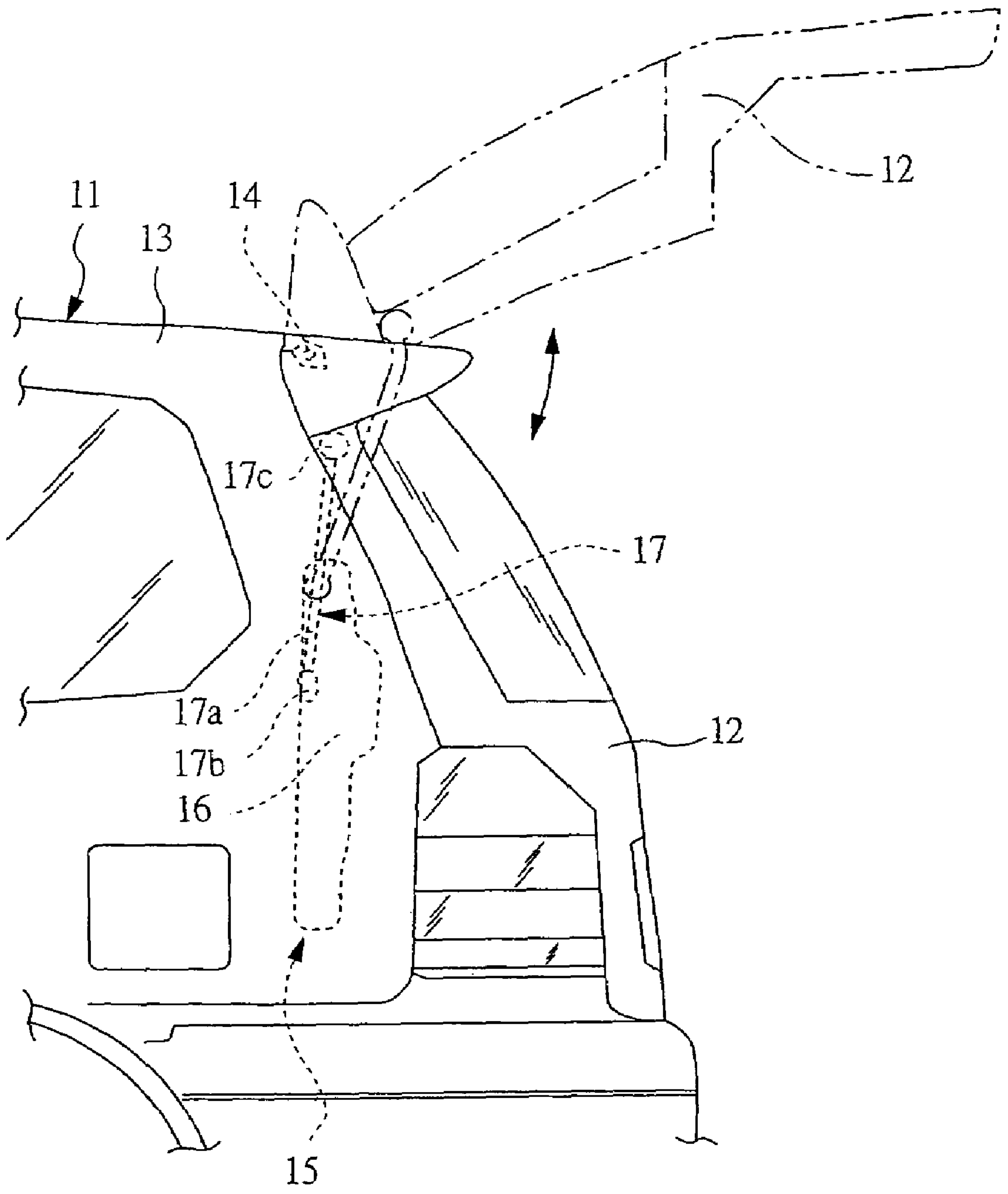
FIG. 1 is a side view showing a portion of a vehicle equipped with an automatically opening/closing apparatus for vehicle according to an embodiment of the present invention.
Figure 2:
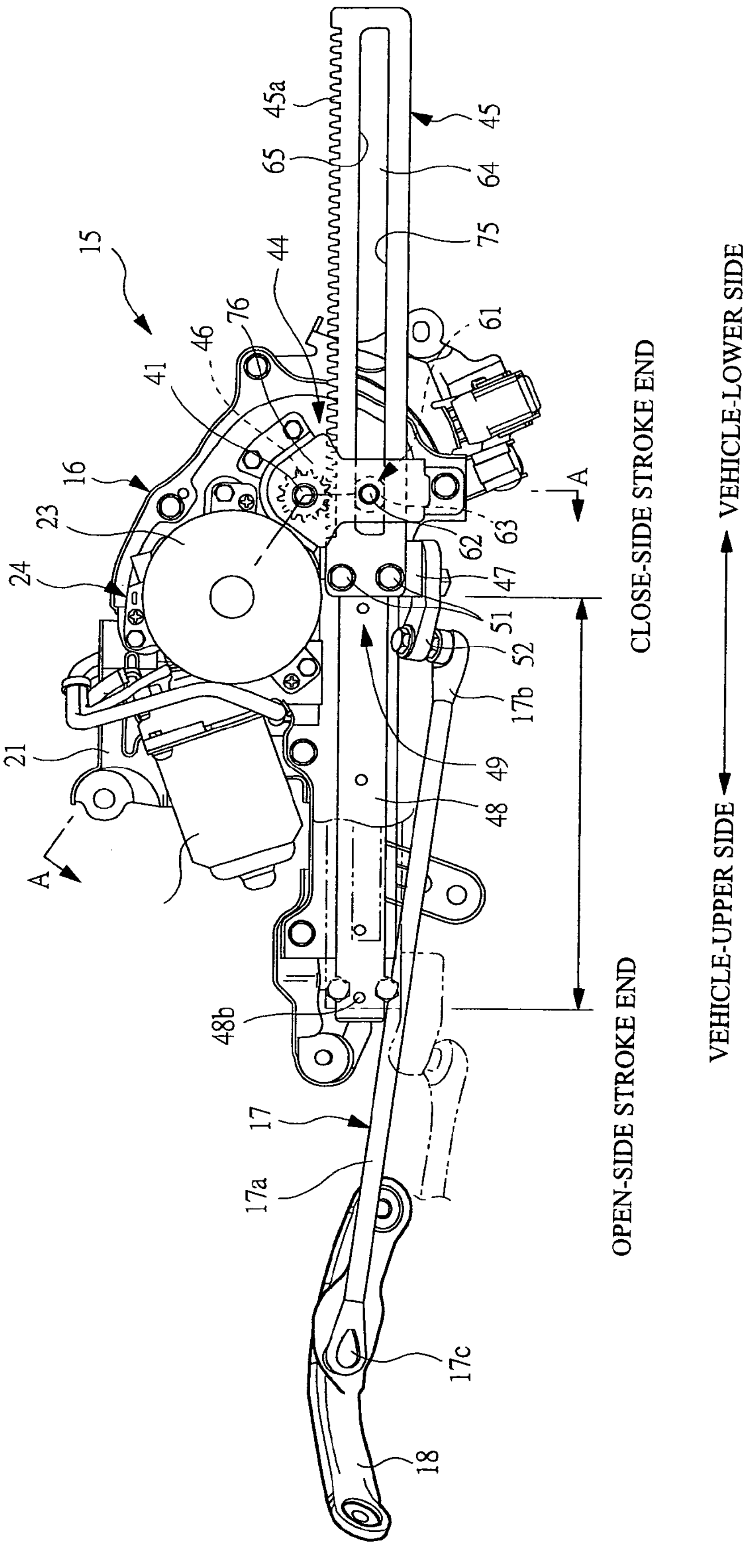
FIG. 2 is a front view illustrating the detail of the automatically opening/closing apparatus for vehicle as shown in FIG. 1.
Figure 3:
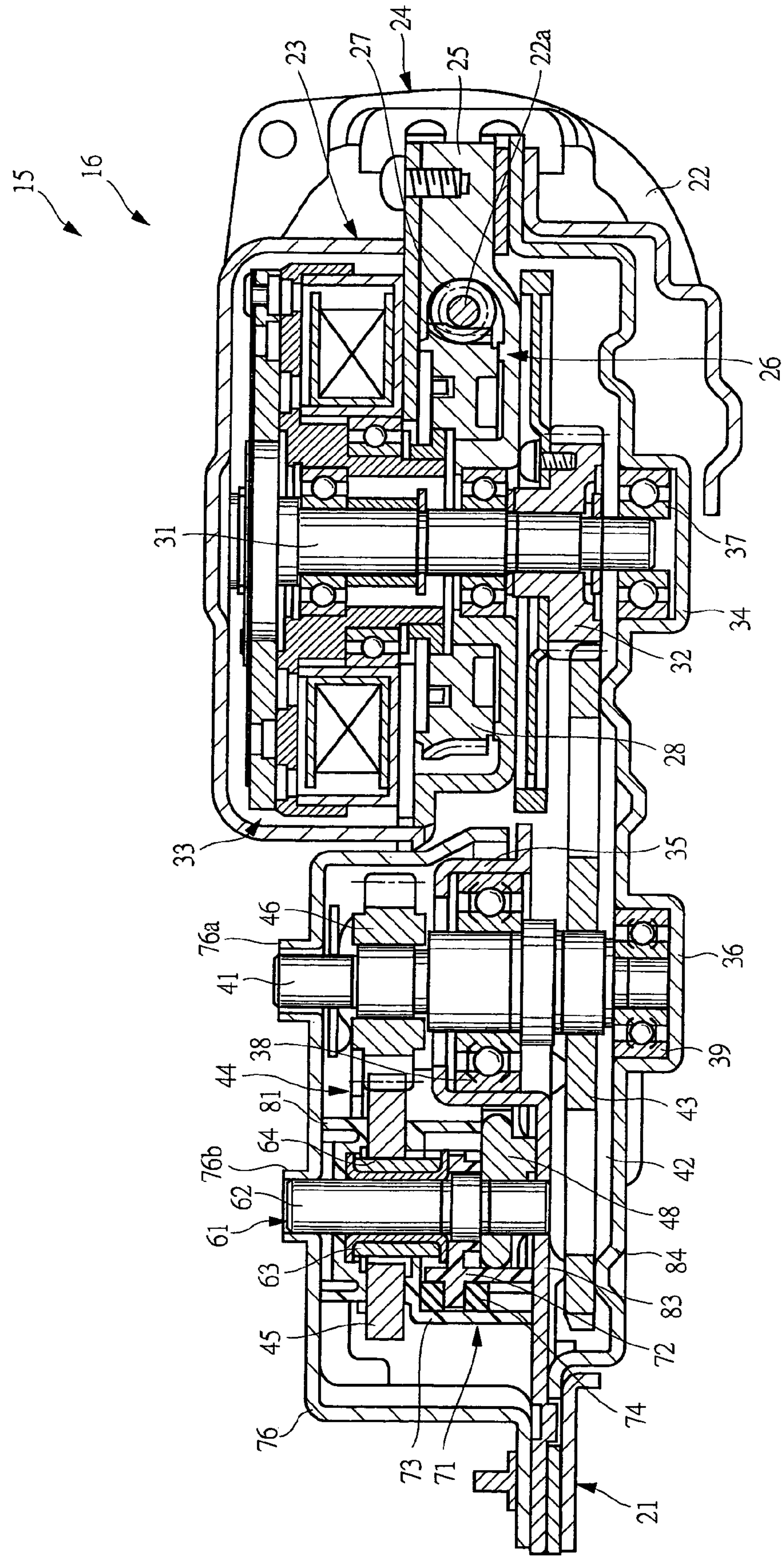
FIG. 3 is a sectional view taken along the line A—A of FIG. 2.

FIG. 1 is a side view showing a portion of a vehicle equipped with an automatically opening/closing apparatus for vehicle according to an embodiment of the present invention; FIG. 2 is a front view illustrating the detail of the automatically opening/closing apparatus for vehicle as shown in FIG. 1; and FIG. 3 is a sectional view taken along the line A—A of FIG. 2.

As shown in FIG. 1, a back door 12 as an opening/closing member is provided at a rear end of a vehicle 11 (shown only partially on a rear side). This back door 12 is mounted on the vehicle 11 through a hinge 14 installed at a rear end of a roof 13, thereby becoming openable and closable vertically in a range of about 90 degrees between a fully closing position indicated by the solid line in FIG. 1 and a fully opening position indicated by the two-dot and dash line in FIG. 1 with respect to an opening/closing central axis of the hinge 14.

Note that a gas stay, which assists the opening/closing operation of the back door 12, may be provided between the vehicle 11 and the back door 12.

Since this vehicle 11 is provided with an automatically opening/closing apparatus for vehicle 15 (hereinafter abbreviated as "opening/closing apparatus 15"), the back door 12 is automatically opened and closed by this opening/closing apparatus 15. The opening/closing apparatus 15 comprises an actuator unit 16 disposed inside a rear pillar of the vehicle 11 and a connecting rod 17 for transmitting output of the actuator unit 16 to the back door 12.

As shown in FIG. 2, the connecting rod 17 comprises a rod portion 17*a* made from steel, and joint portions 17*b* and 17*c* (pillow balls) provided respectively at both ends of the rod portion 17*a* and capable of operating three-dimensionally. The joint portion 17*c* is rotatably connected to the back door 12 via a linking bracket 18. By reciprocating the joint portion 17*b* of the connecting rod 17 substantially vertically with respect to the vehicle 11, the back door 12 can be opened and closed in conjunction with the reciprocation of the connecting rod 17.

Meanwhile, the actuator unit 16 has a base 21 and is fixed to the vehicle 11 through the base 21. A drive unit 24, comprising an electric motor 22 as a drive source and a reduction gear 23, is installed on the base 21, and the electric motor 22 is connected to a control unit (not shown), thereby being controlled by the control unit. As such a control unit, a microcomputer including CPU, and memory, etc. is employed and outputs a control current to the electric motor 22 according to an instruction signal sent from a back-door opening/closing switch (not shown) provided to a vehicle compartment etc. Then, the electric motor 22 is operated in a normal/inverse direction depending on a control current supplied from the control unit.

As shown in FIG. 3, the reduction gear 23 has a structure in which a reduction gear mechanism 26 is accommodated inside a gear case 25 fixed to the electric motor 22 and, in the case as shown in FIG. 3, as the reduction gear mechanism 26, a worm gear mechanism comprising a worm 27 and a worm wheel 28 is employed. The worm 27 is formed in an outer periphery of a rotation shaft 22*a* of the electric motor 22, and the worm wheel 28 is engaged with the worm 27 and is concurrently fixed to an output shaft 31 supported rotatably by the gear case 25. When the electric motor 22 is actuated, the rotation of its rotation shaft 22*a* is reduced to a predetermined rotation number by the worm 27 and the worm wheel 28 and then transmitted to an output shaft 31. Also, a tip of the output shaft 31 projects from the gear case 25 and an output gear 32 is fixed to the tip. That is, when the electric motor 22 is actuated, its rotation is outputted as the rotation of the output gear 32.

Also, a friction type electromagnetic clutch 33 is provided inside the gear case 25, so that drive power between the reduction gear mechanism 26 and the output shaft 31 can be intermittently transmitted by the electromagnetic clutch 33. Therefore, when the back door 12 is opened and closed manually, the electromagnetic clutch 33 is shifted to a power-cutoff condition, so that an operating force at the time of operating manually the back door 12 can be reduced.

As shown in FIG. 3, three shaft supporting portions 34, 35, and 36 are provided on the base 21, and the output shaft 31 of the drive unit 24 is supported rotatably by a bearing 37 mounted at the shaft supporting portion 34. Also, a pinion shaft 41 is supported rotatably by the bearings 38 and 39 mounted at a pair of shaft supporting portions 35 and 36, and an interval between the pinion shaft 41 and the output shaft 31 is set by the pair of shaft supporting portions 34 and 36. Further, a gear accommodating portion 42 is provided to the base 21, and a reduction gear 43 fixed onto the pinion shaft 41 is accommodated in the gear accommodating portion 42. The reduction gear 43 is engaged with the output gear 32 of the drive unit 24, whereby the rotation of the electric motor 22 is transmitted through the output gear 32. Consequently, the pinion shaft 41 is rotate-driven by the electric motor 22.

A gear transmission mechanism 44 is provided in the actuator unit 16, and the rotary motion of the pinion shaft 41 rotate-driven by the electric motor 22 is converted to the reciprocation of the connecting rod 17 by the gear transmission mechanism 44.

Figure 4:
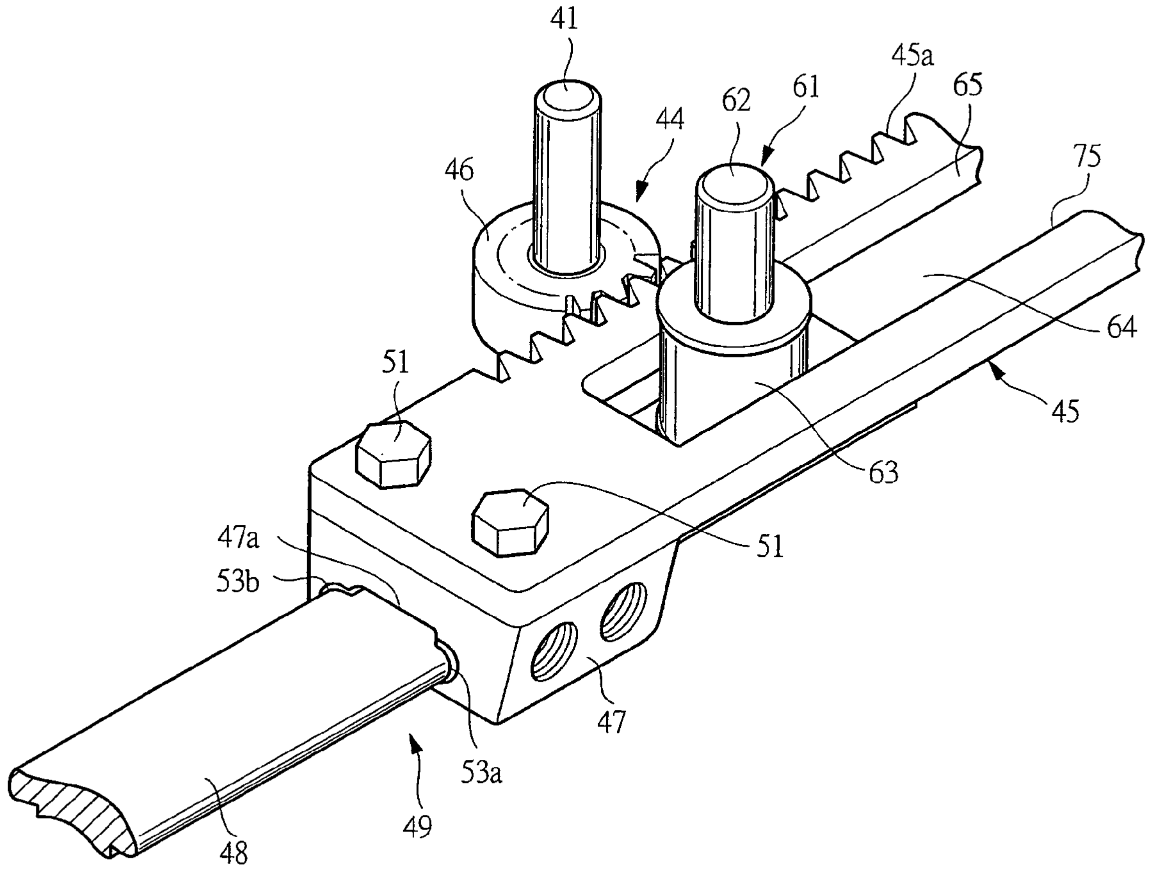
FIG. 4 is a perspective view illustrating the detail of a gear transmission mechanism shown in FIG. 2.
Figure 5:
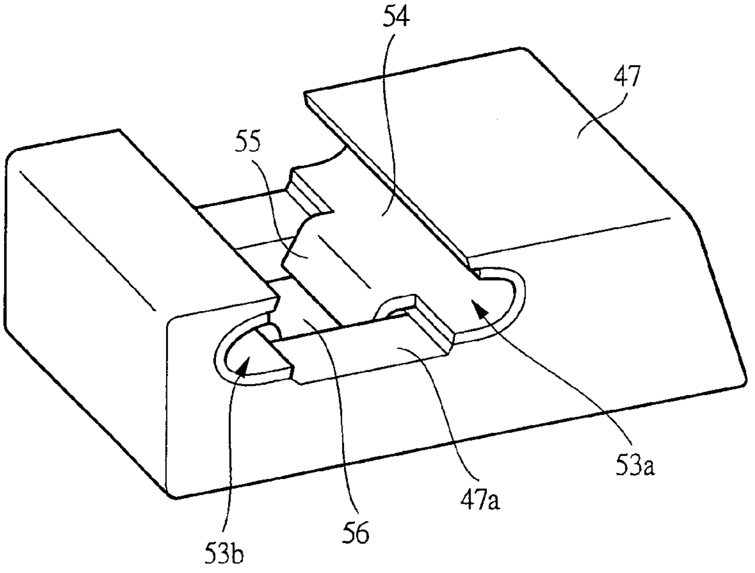
FIG. 5 is a perspective showing the detail of a slide block in FIG. 4.

FIG. 4 is a perspective view illustrating the detail of a gear transmission mechanism shown in FIG. 2, and FIG. 5 is a perspective showing the detail of a slide block in FIG. 4.

As shown in FIG. 4, this gear transmission mechanism 44 is a so-called rack-and-pinion type one provided with a rack 45 and a pinion 46.

The pinion 46 is fixed on the pinion shaft 41 and rotate-driven by the electric motor 22 together with the pinion shaft 41. Meanwhile, the rack 45 made from steel plate is formed into a substantially rectangular shape, and one side of the rack is provided with rack teeth 45*a* arranged axially. Also, the rack teeth 45*a* of the rack 45 are mutually engaged with teeth of the pinion 46, and if the pinion 46 is rotated in a normal/inverse direction by the electric motor 22, the rotation thereof is transmitted to the rack 45 and thereby the rack 45 reciprocates.

Also, a slide block 47 as a slide portion is provided at one end of the rack 45 on a vehicle-upper side while a guide rail 48 as a guide member is fixed to the base 21. The rack 45 is engaged with the guide rail 48 serving as the guide member in the slide block 47 and is supported linearly reicprocably by the guide rail 48 in the slide block 47, and thereby its moving direction is restricted. That is, the slide block 47 and the guide rail 48 constitute a slide mechanism 49, so that the rack 45 is supported linearly reicprocably by this slide mechanism 49 with respect to the base 21.

As shown in FIG. 5, the slide block 47 has a sliding groove 47*a* and is formed into a substantially C-shaped sectional block, and the axial-direction length dimension thereof is sufficiently short with respect to the entire length of the rack 45. The slide block 47 is fixed to an axial-direction end of the rack 45 by a pair of bolts 51. Also, as shown in FIG. 2, the slide block 47 is connected to the other joint portion 17*b* through a linking bracket 52 and, consequently, the slide block 47, that is, the rack 45 is linked to the back door 12, thereby reciprocating along with the back door 12.

Meanwhile, the guide rail 48 is fixed to the base with bolts (not shown) so that its axial direction is directed to a substantially vertical direction of the vehicle 11. The slide block 47 is mounted at the outside of the guide rail 48 within the sliding groove 47*a* to be guided movably along the guide rail 48. That is, this slide mechanism 49 is of a so-called outer rack type one in which the slide block 47 of the rack 45 is installed outside the guide rail 48.

With this structure, the rotation of the pinion 46 rotate-driven by the electric motor 22 is converted to the linear reciprocation of the rack 45, and the linear reciprocation is transmitted to the back door 12 through the connecting rod 17 so as to achieve the automatically opening/closing operation of the back door 12. In this case, the rack 45 becomes linearly reciprocable substantially in the vertical direction with respect to the vehicle 11 between a close-side stroke end indicated by the solid line in FIG. 2 and an open-side stroke end indicated by the two-dot and dash line in FIG. 2.

Figure 6:
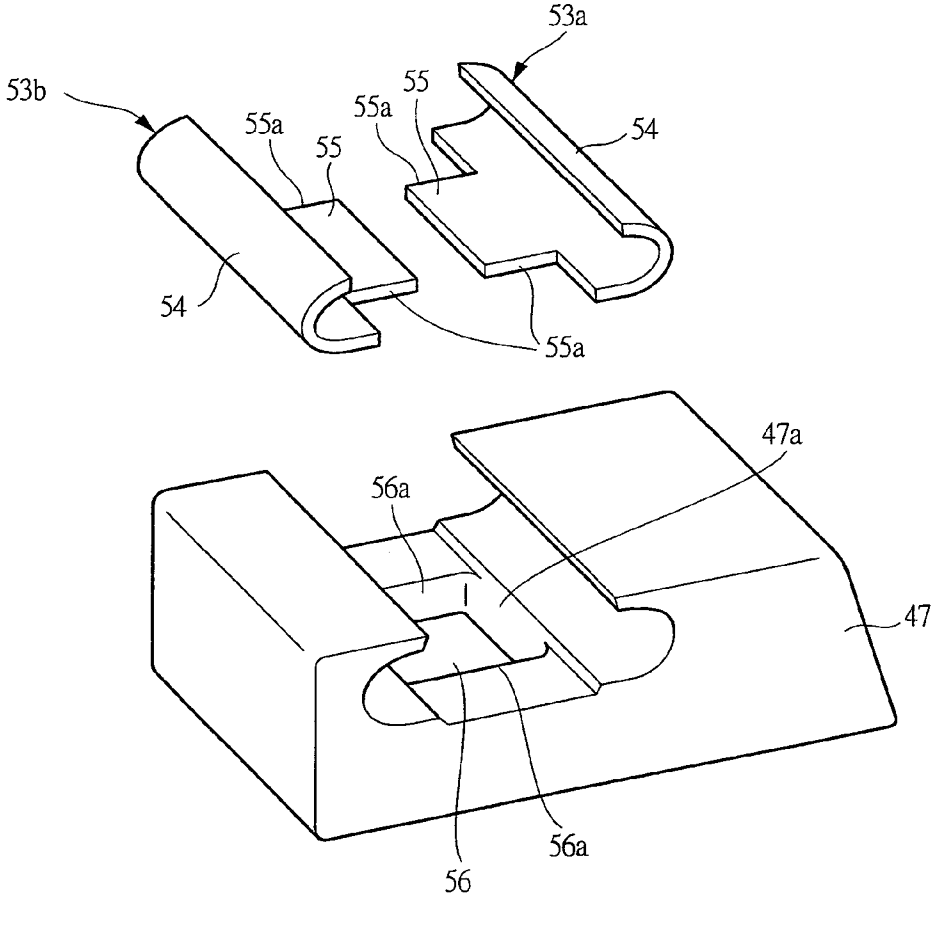
FIG. 6 is a disassembled perspective view of the slide block shown in FIG. 5.
Figure 7A:
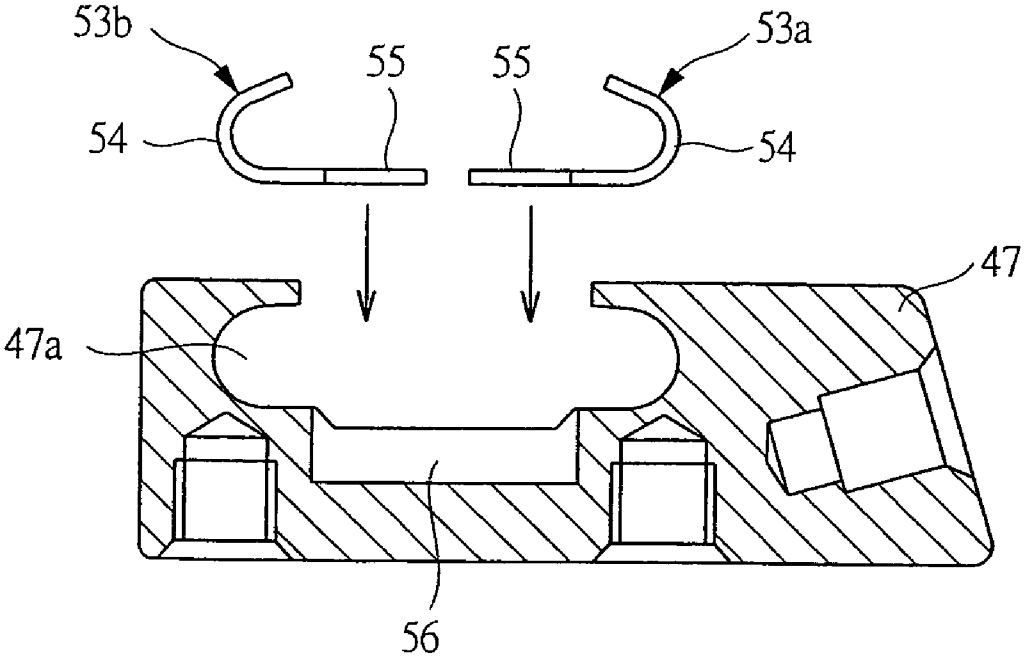
FIG. 7A is a sectional view illustrating an installing method for a sliding member shown in FIG. 6.
Figure 7B:
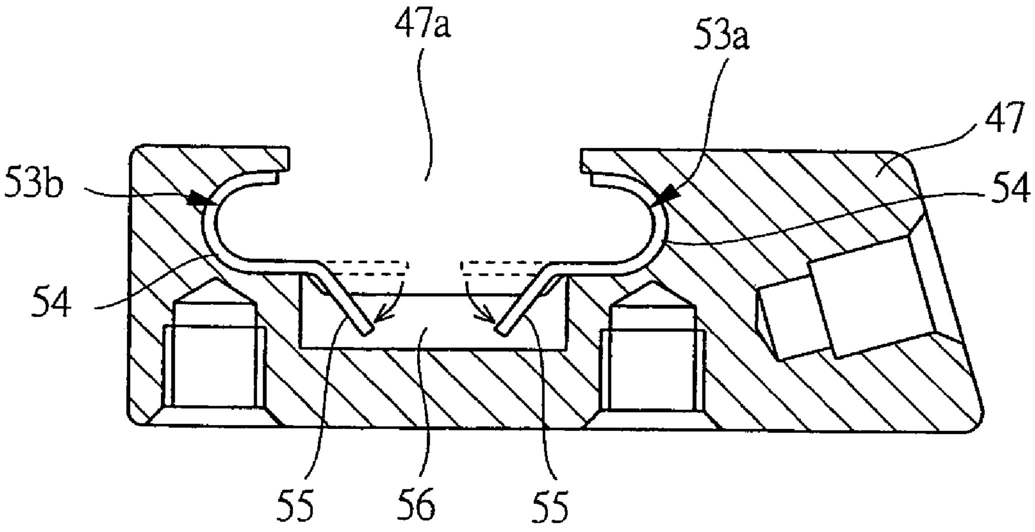
FIG. 7B is a sectional view illustrating an installing method for a sliding member shown in FIG. 6.

FIG. 6 is a disassembled perspective view of the slide block shown in FIG. 5, and FIGS. 7A and 7B are sectional views illustrating an installing method for a sliding member shown in FIG. 6.

A pair of sliding members 53*a* and 53*b* are mounted in the sliding groove 47*a* of the slide block 47, and so sliding friction between the slide block 47 and the guide rail 48 is reduced by these sliding members 53*a* an 53*b*. Note that since the sliding members 53*a* and 53*b* have the same structure and function except that their shapes are symmetrical, only the sliding member 53*a* will be described below.

The sliding member 53*a* is formed by: pressing a sheet material in which a thin resin plate is attached to a surface of a copper plate; and punching out and shaping it to have a predetermined shape. The sliding member 53*a* comprises: a base portion 54 formed into a semi-circle shape to be disposed in the sliding groove 47*a*; and a substantially rectangular engaging portion 55 provided integrally to the base portion 54. A surface inside the base portion 54, that is, on a side that comes in contact with the guide rail 48 is a low friction surface to which a resin sheet is attached, and the base portion 54 makes a slidable contact with the guide rail 48 through the low friction face. Meanwhile, a rectangular engaging hole 56 that opens substantially at the center of the sliding groove 47*a* is formed in the slide block 47. The interval between both side faces 56*a* perpendicular to the axial direction of this engaging hole 56 is substantially the same as the axial-direction width dimension of the engaging portion 55 provided to the sliding member 53*a*.

This sliding member 53*a* is mounted on the slide block 47 by: disposing the base portion 54 in the sliding groove 47*a* of the slide block 47; and bending the engaging portion 55 with respect to the base portion 54 to be engaged with the engaging hole 56. That is, when the sliding member 53*a* is mounted in the slide block 47, as shown in FIG. 7A, the base portion 54 is at first disposed within the sliding groove 47*a*. At this time, the base portion 54 is curved so as to slightly open with respect to the curve of the sliding groove 47*a* in a state of nature, and is elastically deformed in such a close direction as to correspond to the sliding groove 47*a* at the time of being disposed within the sliding groove 47*a* and then is held temporarily in the sliding groove 47*a*. Namely, even before the engaging portion 55 is bent, the sliding member 53*a* becomes held temporarily in the sliding groove 47*a* due to the elastic force generated by the elastic deformation of the base portion 54, whereby the assembly working efficiency is improved.

In a state of holding temporarily the base portion 54 in the sliding groove 47*a*, the engaging portion 55 is disposed so as to close the engaging hole 56 formed in the slide block 47. By bending the engaging portion 55 into the engaging hole 56 from the above-mentioned state along the axial direction of the guide rail 48 using a press machine etc., as shown in FIG. 7B, the engaging portion 55 is engaged with the engaging hole 56 through both axial-direction end faces 55*a* thereof. Consequently, the axial-direction movement of the base portion 54 is restricted with respect to the slide block 47, whereby the sliding member 53*a* is secured to the slide block 47. Note that when the slide block 47 is mounted at the guide rail 48, the sliding member 53*a* is sandwiched between the slide block 47 and the guide rail 48 and thereby a securing direction thereof with respect to the slide block 47 is only the axial direction thereof.

In this case, an axial-direction load applied to the base portion 54 due to the friction with the guide rail 48 is supported by the slide block 47 in the engaging portion 55. However, both of the end faces 55*a* of the engaging portion 55 are engaged with the side faces 56*a* of the engaging hole 56. Therefore, even if the large axial-direction load is applied to the base portion 54, the load can be supported easily. That is, the load applied to the base portion 54 acts as not a bending force but a shearing force to the engaging portion 55 and further the shearing force is applied in a direction extending along a boundary between the base portion 54 and the engaging portion 55. Thus, even if the engaging portion 55 is formed of the sheet material, it is never sheared easily, so that high resistance to the axial-direction load occurs. Accordingly, even if the sliding member 53*a* generates high resistance against the guide rail 48 and thereby an escaping-direction load acts on the base portion 54, the base portion 54 can be prevented from deviating from or being disconnected from the slide block 47.

Thus, in this opening/closing apparatus 15, since the sliding members 53*a* and 53*b* to be mounted on the slide block 47 is provided with the engaging portion 55 to be engaged with the slide block 47, it is possible to prevent the axial-direction deviation or disconnection of the sliding members 53*a* and 53*b* with respect to the slide block 47.

Further, in this opening/closing apparatus 15, since the engaging portions 55 provided on the sliding members 53*a* and 53*b* are bent along the axial direction of the guide rail 48 and is engaged with the engaging hole 56 provided in the slide block 47, the durability and strength of the engaging portion 55 with respect to the axial-direction load can be enhanced.

Also, since the sliding members 53*a* and 53*b* are each formed by pressing the sheet material and punching out it into the predetermined shape, dimensional accuracy of the axial-direction width of the engaging portion 55 is enhanced, so that both end faces 55*a* of the engaging portion 55 can be engaged with both side faces 56*a* of the engaging hole 56 without any gap. Consequently, axial-direction play of the base portion 54 with respect to the slide block 47 can be eliminated, whereby it is possible to reduce abnormal noise due to the play of the base portion 54, and abnormal wearing of the base portion 54, and the like.

As shown in FIG. 4, a holding member 61 is provided to this opening/closing apparatus 15 to restrict engaging-direction movement of the rack 45, so that the interval between the rack 45 and the pinion 46 is held within a predetermined range due to the holding member 61.

The holding member 61 comprises: a holding shaft 62 inserted into a through hole 48*a* formed on one end side of the guide rail 48 so as to oppose the pinion shaft 41; and a roller 63 mounted outside the holding shaft 62. The roller 63 is rotatable to the holding shaft 62. Meanwhile, a groove portion 64 axially extending is formed in the rack 45, and the above-mentioned roller 63 is disposed in this groove portion 64. Also, a surface, which is on a rear side opposite to the rack teeth 45*a* of the groove portion 64, acts as a holding face 65, and the above roller 63 can contact with the holding face 65. Therefore, even if a load in a direction away from the pinion shaft 41 is applied to the rack 45 due to the engaging resistance between the rack teeth 45*a* and the pinion 46, and vibration from the outside, etc., the load is supported by the roller 63, that is, the holding shaft 62, so that the movement of the rack 45 in the direction away from the pinion shaft 41 is restricted. Namely, the interval between the rack 45 and the pinion 46 is maintained due to the holding member 61 comprising the roller 63 contacting with the holding face 65 and the holding shaft 62, whereby the engagement between the rack teeth 45*a* of the rack 45 and the pinion 46 is kept under an appropriate condition.

As described above, the slide block 47 supported linearly reciprocably by the guide rail 48 is formed at the sufficient short length dimension with respect to the entire length of the rack 45, so that when the load in the direction away from the pinion shaft 41 is applied to an opposite end at which the slide block 47 of the rack 45 is provided, it is difficult to support the load by the slide block 47. However, in this opening/closing apparatus 15, the movement in the direction away from the pinion 46, that is, the interval between the rack 45 and the pinion 46 is maintained by the holding member 61, so that even if the axial-direction dimension of the slide block 47 is formed to be sufficiently short with respect to the entire length of the rack 45, the engagement between the rack 45 and the pinion 46 can be ensured. Therefore, in the opening/closing apparatus 15, by making the axial-direction length dimension of the slide block 47 short, it is possible to reduce the opening/closing apparatus 15 in size and weight.

Also, by shortening the axial-direction length of the slide block 47, the axial-direction length of the guide rail 48 can be shortened accordingly. That is, since the operating range of the slide block 47 is reduced depending on the reduction in the axial-direction length thereof, the axial-direction length of the guide rail supporting the slide block 47 can be shortened. Consequently, the opening/closing apparatus 15 can be further reduced in size and weight.

Thus, in the opening/closing apparatus 15, since the rack 45 is supported linearly reciprocably by the guide rail 48 through the slide block 47 and the interval between the rack 45 and the pinion 46 is held by the holding member 61, the opening/closing apparatus 15 can be reduced in size and weight by shortening the length dimension of the slide block 47 and the guide rail 48. Also, since the interval between the rack 45 and the pinion 46 is kept at an interval suitable for the engagement by the holding member 61, the operating noise and the vibration can be reduced by stabilizing the engagement of the rack teeth 45*a* of the rack 45 and the pinion 46.

Further, because the opening/closing apparatus 15 can be easily set by modifying slightly the slide block 47, the rack 45, the guide rail 48, the holding member 61, or the like so as to meet various specifications, the general-purpose characteristics of the opening/closing apparatus 15 can be improved.

As shown in FIG. 3, the opening/closing apparatus 15 is provided with a vibration damping mechanism 71 for reducing the vibration of the rack 45 generated in stopping the opening and closing operations.

Figure 8:
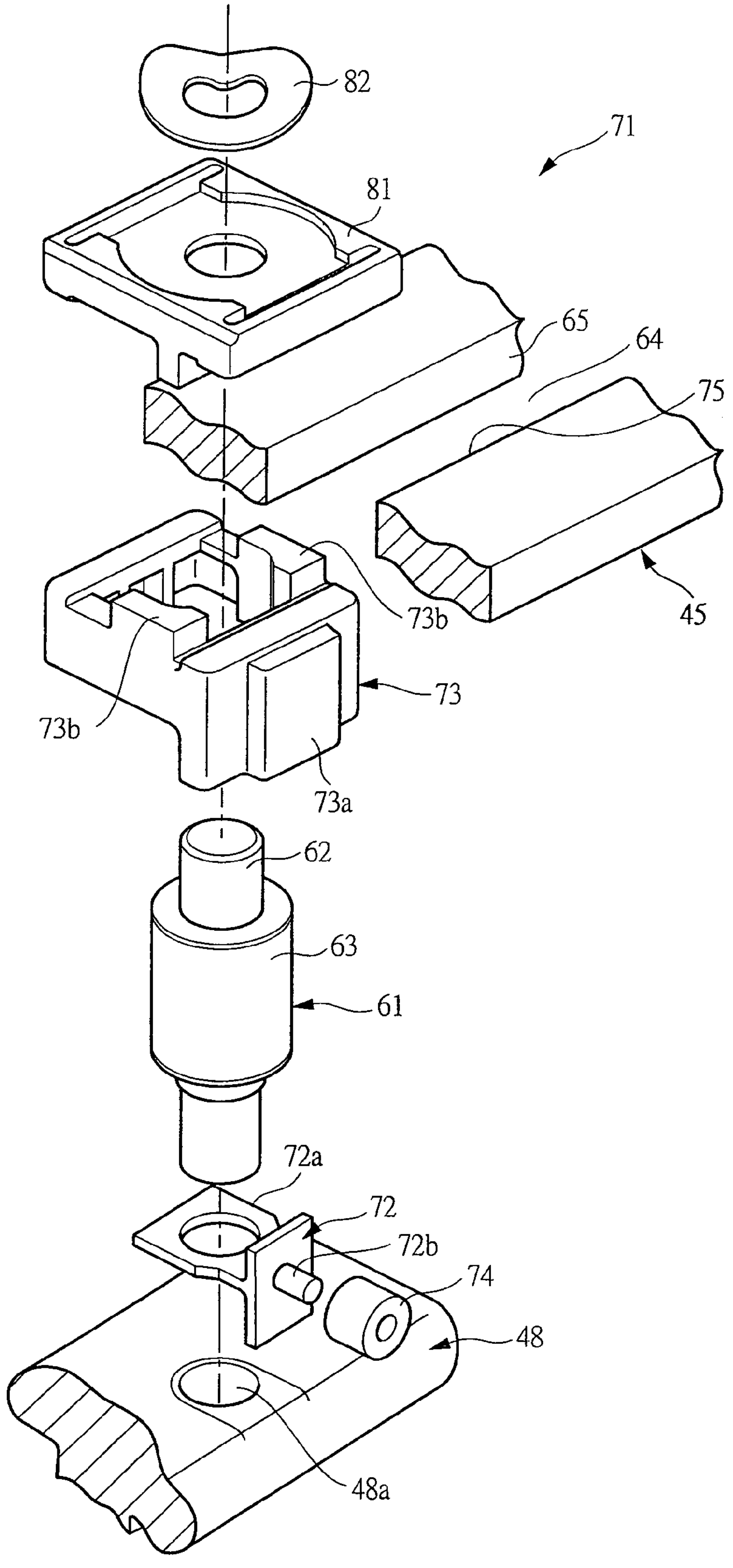
FIG. 8 is a disassembled perspective view illustrating the detail of a vibration damping mechanism shown in FIG. 3.

FIG. 8 is a disassembled perspective view illustrating the detail of a vibration damping mechanism shown in FIG. 3. As shown in FIG. 8, this vibration damping mechanism 71 comprises a supporting piece 72, a lower rack guide 73 as an engaging-direction pressing member, and a cushion rubber 74 as an engaging-direction elastic member.

The supporting piece 72 comprises a fixing portion 72*a* to be fixed to the holding shaft 62, and a supporting column portion 72*b* projecting from the fixing portion 72*a* in an opposite direction to the pinion shaft 41, wherein the circular cushion rubber 74 is mounted in the supporting column portion 72*b*. The supporting piece 72 contacts with the guide rail 48, whereby the axial-direction movement with respect to the holding shaft 62 becomes restricted.

Meanwhile, the lower rack guide 73 is mounted on the holding shaft 62 so as to cover the supporting piece 72 and become movably in the direction of the engagement of the rack 45 and the pinion 46 and is concurrently supported slidably by the guide rail 48, whereby the axial-direction movement with respect to the holding shaft 62 is restricted. Also, the lower rack guide 73 is provided with a wall portion 73*a* contacting with the cushion rubber 74, and the cushion rubber 74 is disposed in an elastically deformed state in the supporting piece 72, namely, between the holding shaft 62 and the wall portion 73*a*. Consequently, the lower rack guide

73 is energized (biased) in a direction away from the pinion 46 due to the elastic force of the cushion rubber 74.

Figure 9:
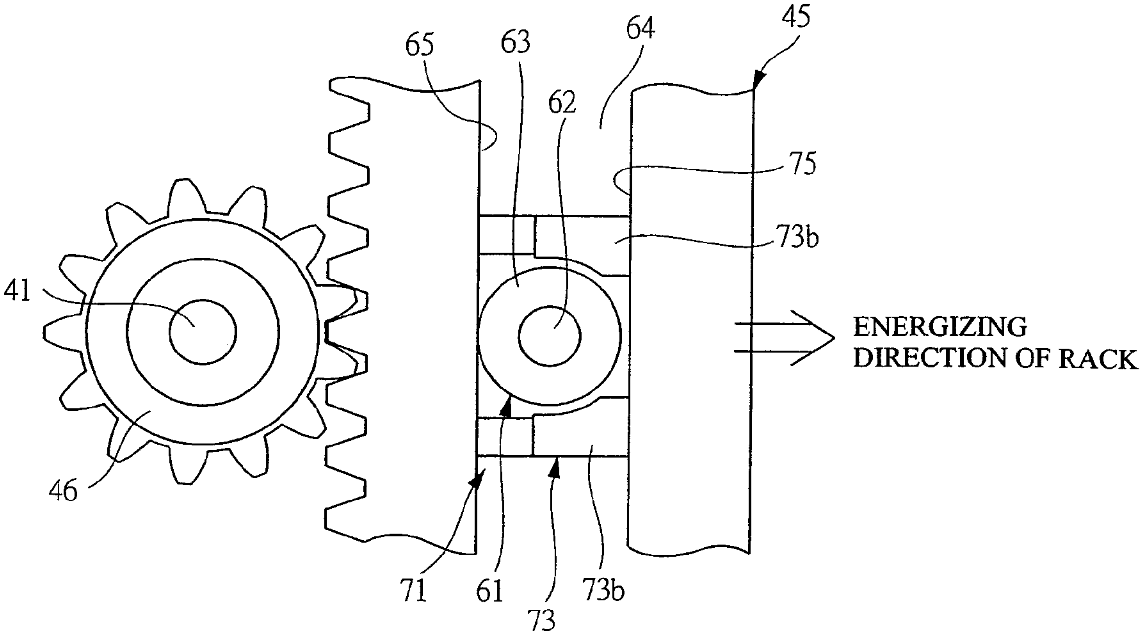
FIG. 9 is an explanatory diagram for illustrating an energizing direction of a rack by the vibration damping mechanism shown in FIG. 8.

Also, as shown in FIG. 9, a projecting portion 73*b* of the lower rack guide 73 contacts with a pressing face 75 located on a side opposite to the holding face 65 of the rack 45, and the elastic force of the cushion rubber 74 to be applied to the lower rack guide 73 is transmitted to the rack 45 through the projecting portion 73*b*. Consequently, the rack 45 is always energized in such a direction that its holding face 65 contacts with the roller 63, due to the elastic force of the cushion rubber 74. Thus, even if the interval between the holding face 65 formed on the rack 45 and the pinion shaft 41 is set narrower in view of a tolerance thereof and the like, the rack 45 always contacts with the roller 63. Therefore, even if the vibration is applied to the rack 45 in stopping the operation, noise generated by the vibration of the rack 45 between the pinion 46 and the roller 63 is reduced.

Thus, in the opening/closing apparatus 15, the rack 45 is always energized in such a direction that the holding face 65 contacts with the roller 63 due to the elastic force of the cushion rubber 74. Consequently, the noise generated by the vibration of the rack 45 between the pinion 46 and the roller 63 can be reduced.

Further, since the rack 45 is always energized in such a direction that the holding face 65 contacts with the roller 63 due to the elastic force of the cushion rubber 74, the interval between the rack 45 and the pinion 46 is always kept constant. Therefore, the engagement of the rack teeth 45*a* of the rack 45 and the pinion 46 is stabilized, whereby the operational noise and vibration generated from the engaging portion of the rack teeth 45*a* and the pinion 46 can be reduced.

Further, since the width dimension of the groove portion 64 provided to the rack 45 can be set to be sufficiently large with respect to the roller 63, there never arises the problem that the width of the groove portion 64 becomes too narrow due to processing errors etc. and thereby malfunctioning of the roller 63 occurs. Therefore, the processing of the groove portion 64 is facilitated and the quality of the opening/closing apparatus 15 can be improved.

Additionally, in the opening/closing apparatus 15, since the vibration damping mechanism 71 can be formed within the width dimension of the rack 45, the opening/closing apparatus 15 can be miniaturized. Particularly, when the opening/closing apparatus 15 is mounted inside the roof of the vehicle 11, the vertical dimension thereof is reduced and thereby the ceiling of the vehicle compartment can be made high.

As seen from FIGS. 1 and 3, a supporting cover 76 is fixed to the base 21 so as to cover the holding shaft 62, and respective ends of the holding shaft 62 and the pinion shaft 41 are engaged with supporting holes 76*a* and 76*b* formed in the supporting cover 76. That is, the interval between the holding shaft 62 and the pinion shaft 41 is maintained at a predetermined one by the supporting cover 76.

Further, between the rack 45 and the supporting cover 76, there are disposed an upper rack guide 81 as an axial-direction pressing member and a wave washer 82 as an axial-direction elastic member, which constitute the vibration damping mechanism 71. The upper rack guide 81 is movably mounted axially on the holding shaft 62, wherein one end thereof contacts with an axial-direction end face of the rack 45. Meanwhile, the wave washer 82 is elastically deformed and mounted between the upper rack guide 81 and the supporting cover 76. The upper rack guide 81 is always energized toward the rack 45 due to the elastic force of the wave washer 82. At this time, since a base-side end of the rack 45 contacts with the lower rack guide 73, the movement of the rack 45 becomes restricted on a side of the base 21. Therefore, the rack 45 is not needlessly moved toward the base 21 due to the elastic deformation of the wave washer 82. With this structure, the axial-direction vibration of the holding shaft 62 generated in the rack 45 is absorbed by the wave washer 82 and reduced.

Thus, in the opening/closing apparatus 15, since the rack is always energized axially due to the elastic force of the wave washer 82, the vibration of the rack 45 can be reduced even if vibration is applied to the rack 45 in stopping the operation.

Figure 10:
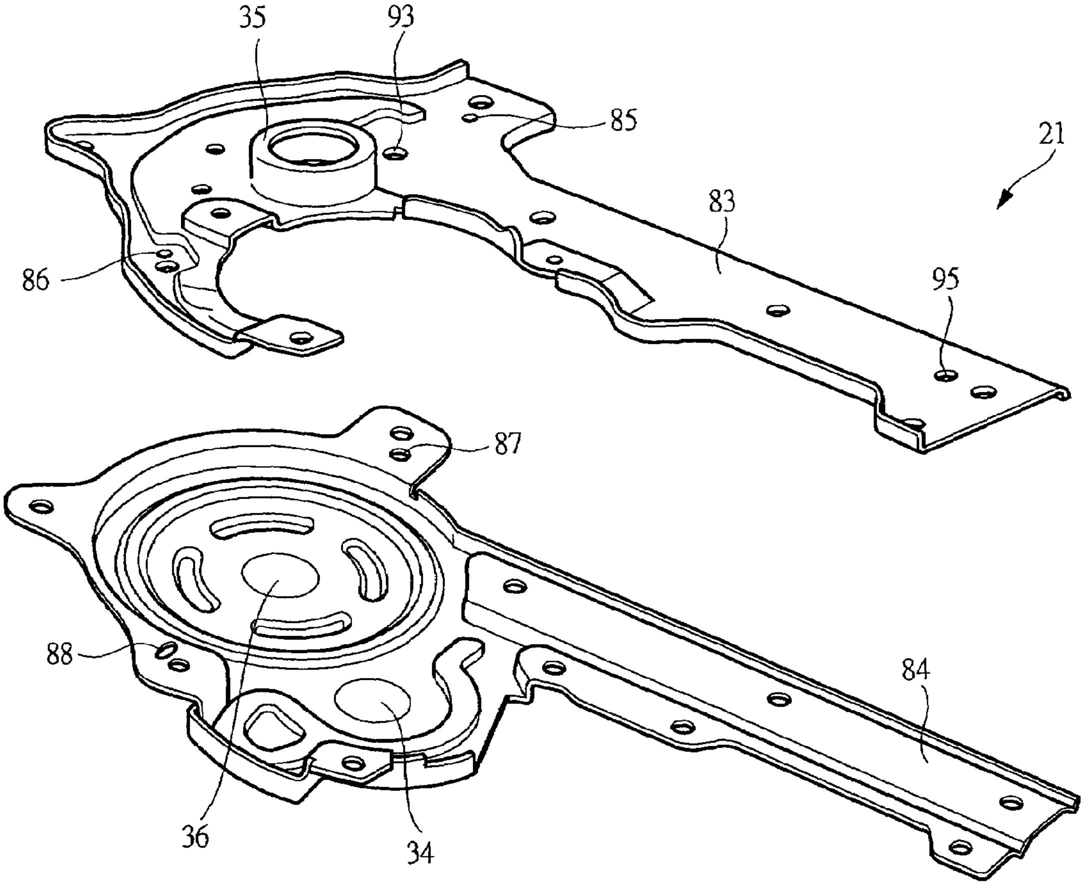
FIG. 10 is a disassembled perspective view illustrating the detail of a base shown in FIG. 2.
Figure 11:
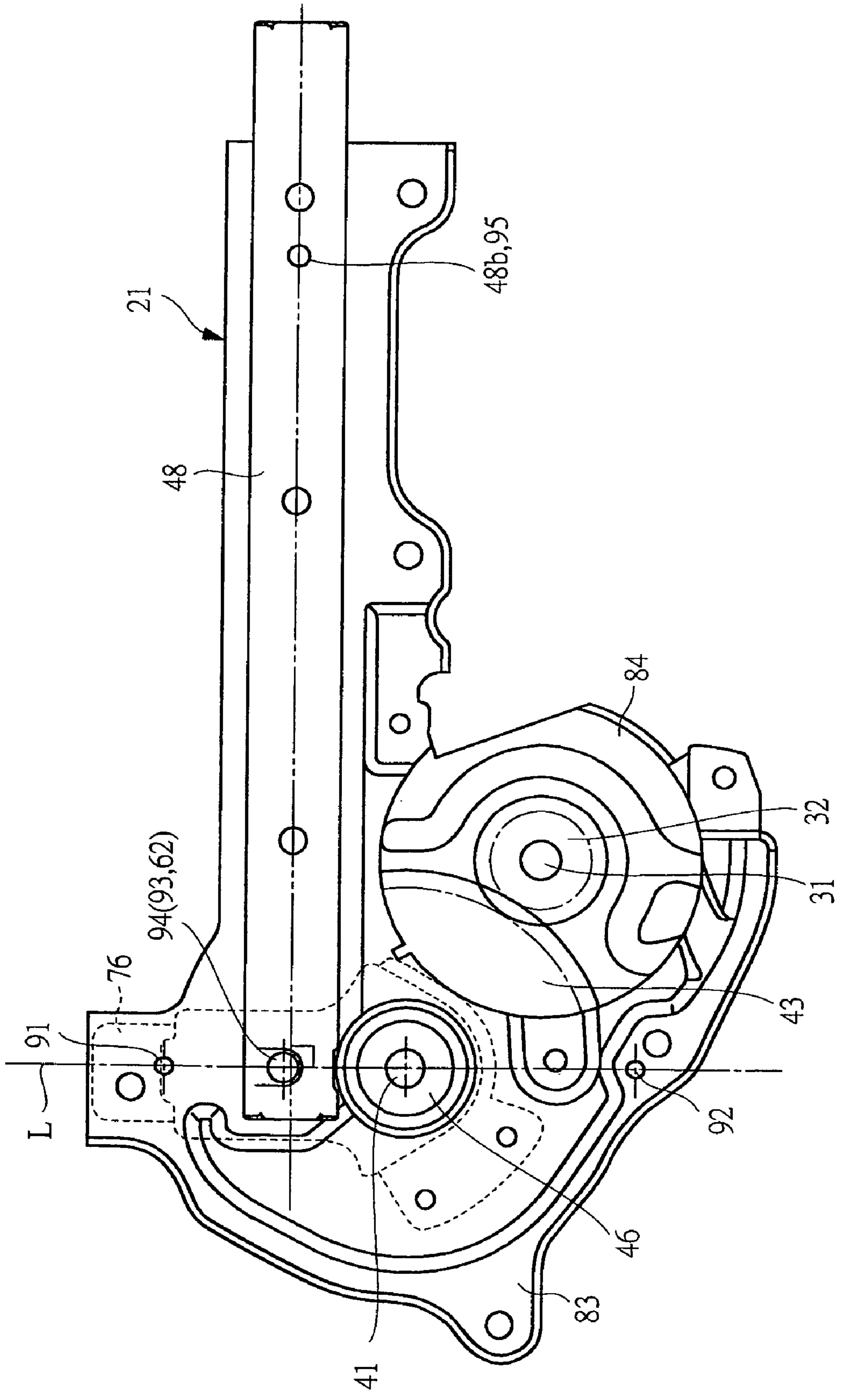
FIG. 11 is an explanatory diagram for showing a positional relation of each positioning member on the base.

FIG. 10 is a disassembled perspective view illustrating the detail of a base shown in FIG. 2, and FIG. 11 is an explanatory diagram for showing a positional relation of each positioning member on the base.

In order to accommodate the reduction gear 43 therein, the base 21 for use in the actuator unit 16 is formed so as to be divided into two along the axial direction of the pinion shaft 41. That is, the base 21 comprises a first base body 83 and a second base body 84 which are assembled to each other, wherein the reduction gear 43 is accommodated in a gear accommodating portion 42 formed between the first and second base bodies 83 and 84 and the guide rail 48 is fixed to the first base body 83. Note that fastening members such as bolts and nuts (not shown), which are inserted into plural assembly holes provided in the respective base bodies 83 and 84, are used to assemble the base bodies 83 and 84.

The above-mentioned shaft supporting portion 35 is provided on the first base body 83. A pair of positioning bosses 85 and 86 are provided to the first base body 83 on a straight line passing the axis of the shaft supporting portion 35 and on both sides between which the shaft supporting portion 35, that is, the pinion shaft 41 is provided. Each of the positioning bosses 85 and 86 is formed into a cylinder shape projecting toward the second base body 84.

Meanwhile, the above-mentioned shaft supporting portions 34 and 36 are provided to the second base body 84. That is, the interval between the pinion shaft 41 and the output shaft 31 is set up depending on the shaft supporting portions 34 and 36 provided to the second base body 84. For this reason, since the first and second base bodies 83 and 84 are formed by pressing steel plates and, at this time, the respective shaft supporting portions 34 to 36 are formed, the interval between the pinion shaft 41 and the output shaft 31 can be set up with high accuracy by supporting the pinion shaft 41 and the output shaft 31 at the shaft supporting portions 34 and 36 provided to the second base body 84. Therefore, the accuracy of the engagement position between the reduction gear 43 fixed on the pinion shaft 41 and the output gear 32 fixed on the output shaft 31 can be improved and thereby the operating noise, vibration, and the like can be reduced.

Further, a pair of positioning holes 87 and 88 are provided to the second base body 84 on a straight line passing the axis of the shaft supporting portion 36 and on both sides between which the shaft supporting portion 36 is sandwiched. The positioning holes 87 and 88 are formed at such positions as to correspond to the positioning bosses 85 and 86 provided on the first base body 83, respectively. Also, the positioning hole 87 is formed into a circular shape having the same inside diameter as the outside diameter of the positioning boss 85 in dimension, and the positioning hole 88 is formed into an elongate hole whose the width dimension in a direction perpendicular to a straight line passing the shaft supporting portion 36 is equal to the outside diameter of the positioning boss 86 and whose the linear dimension is larger than the outside diameter of the positioning boss 86.

In assembling the first and second base bodies 83 and 84 to each other, the positioning of such assembly is achieved by engaging the positioning bosses 85 and 86 with the positioning holes 87 and 88, respectively. That is, the positioning boss 85 and the positioning hole 87, and the positioning boss 86 and the positioning hole 88 constitute base body positioning portions 91 and 92, respectively, wherein the positioning in assembling the first and second base bodies 83 and 84 to each other is carried out by the base body positioning portions 91 and 92. Consequently, the accuracy of assembly of the first and second base bodies 83 and 84 is improved, so that the axes of the shaft supporting portions 35 and 36 provided on the respective base bodies 83 and 84 can be made to coincide with each other. Therefore, the pinion shaft 41, which is supported rotatably by the first and second base bodies 83 and 84 through the bearings 38 and 39, cannot be inclined to a regular position. Further, since the positioning hole 88 has the elongate-hole shape, the assembly of the first and second base bodies 83 and 84 is possible even if each position of the positioning bosses 85 and 86 is deviated to a degree of dimensional tolerance.

Thus, in the opening/closing apparatus 15, the first and second base bodies 83 and 84 to be assembled to each other are provided with the base body positioning portions 91 and 92, the accuracy of assemble of the first and second base bodies 83 and 84 can be improved.

Also, the holding shaft 62 passing through the through hole 48*a* provided in the guide rail 48 projects from the guide rail 48 and is engaged with the rail positioning hole 93 provided in the first base body 83. That is, the holding shaft 62 has a function as a so-called knock pin for positioning the guide rail 48 with respect to the first base body 83, namely, the holding shaft 62 constitutes the rail positioning portion 94 together with the rail positioning hole 93. Further, a through hole 48*b* is provided in the guide rail 48 a predetermined distance away from the through hole 48*a* in the axial direction, wherein the rail positioning boss 95 provided on the first base body 83 is engaged with the through hole 48*b*. In this way, the holding shaft 62 is engaged with the rail positioning hole 93 and the rail positioning boss 95 is engaged with the through hole 48*b*, so that the guide rail 48 is positioned with respect to the first base body 83.

As shown in FIG. 11, in the opening/closing apparatus 15, the rail positioning hole 93 provided in the first base body 83, and the axis of the holding shaft 62 inserted into the through hole 48*a* of the guide rail 48, that is, the axis of the rail positioning portion 94 are disposed on a straight line L, which passes the base body positioning portions 91 and 92 for positioning the assembly positions of the first and second base bodies 83 and 84 and the axis of the pinion shaft 41 supported by the bearings 38 and 39 accommodated in the shaft supporting portions 35 and 36. That is, the axis of the pinion shaft 41, the base body positioning portions 91 and 92, and the rail positioning portion 94 are disposed on a straight line as viewed from the axial direction of the pinion shaft 41. Also, the axial direction of the guide rail 48 is set perpendicularly to the straight line L, so that the direction of the engagement of the rack 45 and the pinion 46 coincides with the straight line L.

Thus, the positional relation between the axis of the pinion shaft 41 and the respective positioning portions 91, 92, and 94 is determined depending on the setting of dimensions directed to the same direction by using the axis of the pinion shaft 41 as a reference. Therefore, by using as the minimum value the dimensional tolerance etc. generated in setting each position of the positioning portions 91, 92, and 94, the positions of the respective positioning portions 91, 92, and 94 can be set up accurately. Further, since the axial direction of the guide rail 48 is set to be perpendicular to the straight line L, the position of the rail positioning boss 95 can be set up accurately so that the dimensional tolerance is kept to have the minimum value. Therefore, the installation accuracy of the respective base bodies 83 and 84 and the accuracy of the installation of the guide rail 48 onto the first base body 83 can be improved.

As described above, in the opening/closing apparatus 15, the axis of the pinion shaft 41, the base body positioning portion 91, and the rail positioning portion 94 are disposed on the same straight line, and the axial direction of the guide rail 48 is set up to be perpendicular to the straight line L passing the axis of the pinion shaft 41, the base body positioning portions 91 and 92, and the rail positioning portion 94. Therefore, the installation accuracy of each member can be improved. Further, since the installation accuracy of each member is improved, the verticality of the pinion shaft 41 and the dimensional accuracy such as the interval between the rack 45 and the pinion 46 are improved, so that the operation of the opening/closing apparatus 15 can be made smooth.

Needless to say, the present invention is not limited to the above-mentioned embodiment and can be variously altered and modified without departing from the gist thereof. For example, in the above-described embodiment, the opening/closing member is detailed as the back door 12 openably/closably mounted vertically on the rear end of the vehicle 11. However, the present invention is not limited to this example and may be applied to another opening/closing member such as a laterally opening door.

Also, in the above-described embodiment, the actuator unit 16 is fixed to the interior of the pillar of the vehicle 11. However, the present invention is not limited to this example and may be disposed inside the roof 13 of the vehicle 11. In this case, the rack 45 is reciprocably provided substantially horizontally to the vehicle 11.

Further, in the above-described embodiment, the sliding member is not limited to a member in which the engaging portion 55 is engaged with the engaging hole 56 provided in the slide block 47. For example, the sliding member may be a member having, as shown in FIG. 12, the pawl-like engaging portion 55 which is formed so as to project axially from the base 54 and to be bent toward the axial-direction end face of the slide block 47.

Additionally, in the above-described embodiment, a pair of the sliding members 53*a* and 53*b* are used as sliding members. However, the present invention is not limited to this example, and, for example, as shown in FIG. 13, may use an integrally formed sliding member 96 which has a pair of engaging portions 55 and is formed symmetrically with respect to these engaging portions 55.

Figure 14:
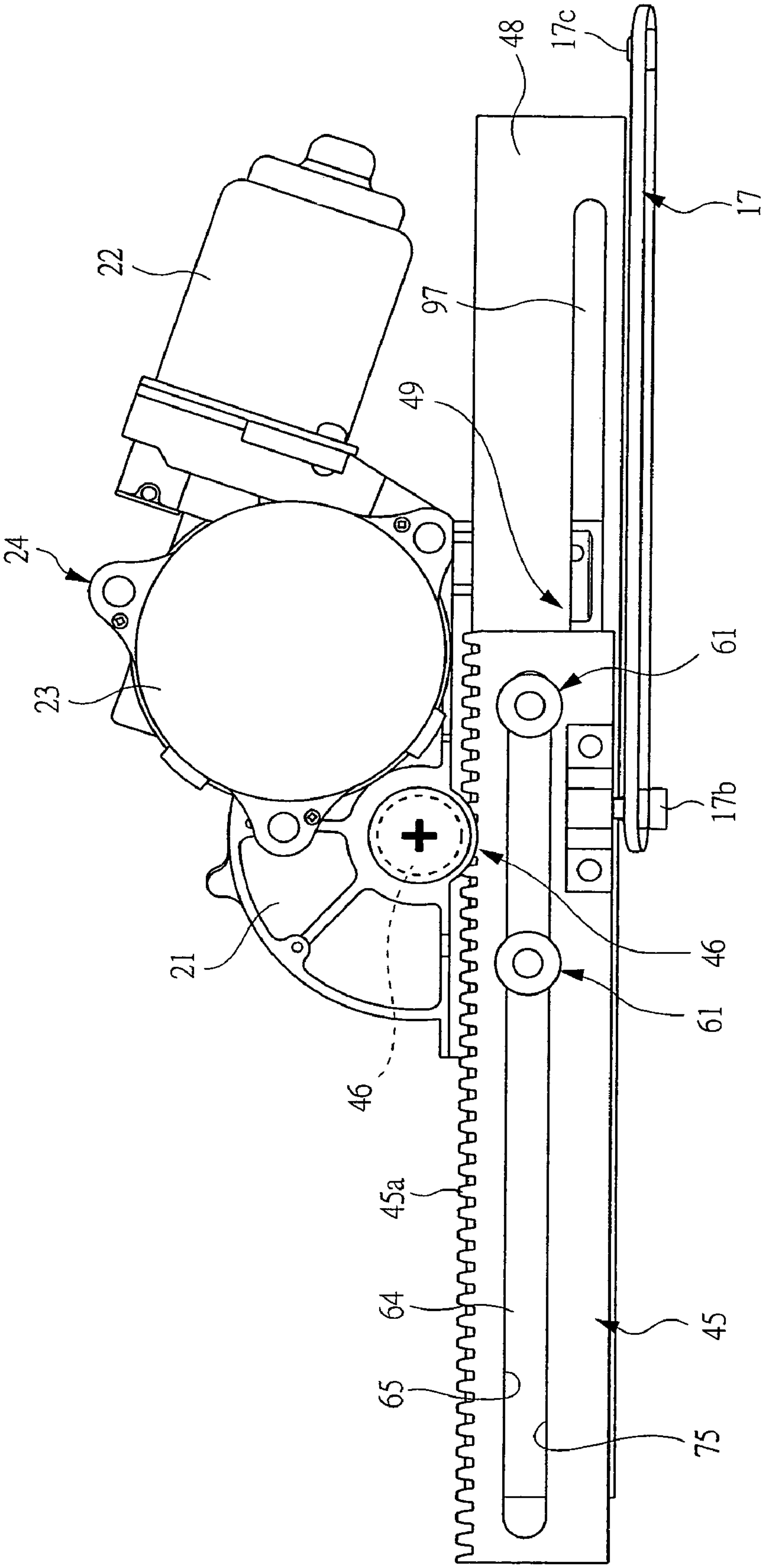
FIG. 14 is a front view illustrating a modified example of the automatically opening/closing apparatus for vehicle as shown in FIG. 2.

Further, in the above-described embodiment, one holding member 61 opposing the pinion shaft 41 is provided. However, the present invention is not limited to this example, and, for example, as shown in FIG. 14, may provide a plurality of holding members 61 arranged at a predetermined space along the holding face 65. In the illustrated example, a pair of the holding members 61 are provided at positions symmetrical to the pinion shaft 41 and, in this case, the supporting strength of the rack 45 by the holding members 61 increases and thereby torsion etc. of the rack 45 can be suppressed. Note that, in the illustrated case, a pin member (not shown) is provided on the rack 45, and since the pin member is engaged with a groove 97 provided in the guide rail 48, the rack 45 is guided by the guide rail 48.

Figure 12:
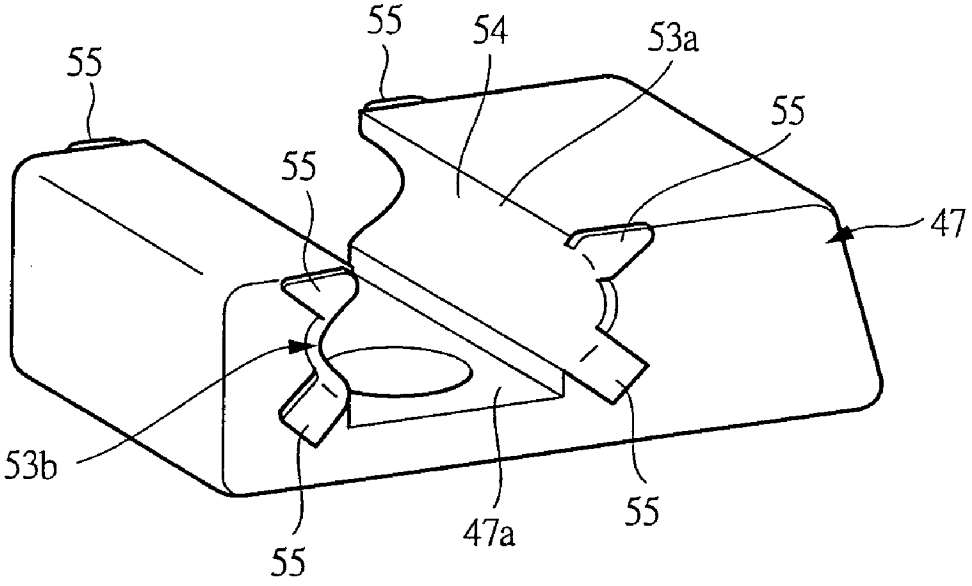
FIG. 12 is a perspective view illustrating a modified example of a sliding member shown in FIG. 6.
Figure 13:
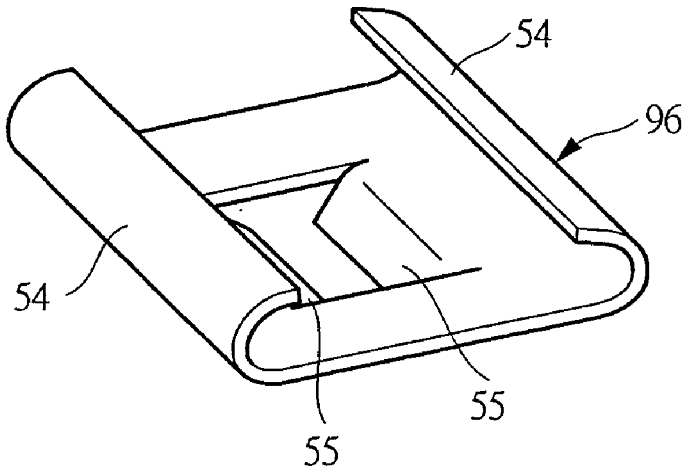
FIG. 13 is a perspective view illustrating a modified example of the sliding member shown in FIG. 6.

Note that, members in FIGS. 12, 13, and 14, which correspond to the above-described members in the embodiment, are denoted by the same reference numbers.

Additionally, the axial direction of the guide rail needs to be substantially at right angle to the straight line L, and further the axes of the respective positioning portions 91, 92, and 94 and the axis of the pinion shaft 41 need to be located substantially on the same straight line.

What is claimed is:

1. An automatically opening/closing apparatus for vehicle, having a rack connected to an opening/closing member mounted on a vehicle and a drive source for rotate-driving a pinion engaged with rack teeth of said rack so as to automatically open/close said opening/closing member, the apparatus comprising:

a slide mechanism including a slide portion provided on a side of an axial-direction end of said rack and a guide member linearly reciprocably engaged with said slide portion and thereby supporting linearly reciprocably said rack; and a holding member contacting with a holding face of said rack, which is formed on a rear side with respect to said rack teeth, and thereby maintaining an interval between said rack and said pinion.

2. The automatically opening/closing apparatus for vehicle according to claim 1, wherein a plurality of said holding members are each arranged along said holding face with a predetermined space.

3. An automatically opening/closing apparatus for vehicle, having a rack connected to an opening/closing member mounted on a vehicle and a drive source for rotate-driving a pinion engaged with rack teeth of said rack so as to automatically open/close said opening/closing member, the apparatus comprising:

a slide mechanism including a slide portion provided on a side of an axial-direction end of said rack and a guide member engaged with said slide portion and thereby supporting linearly reciprocably said rack;

a holding member contacting with a holding face of said rack, which is formed on a rear side with respect to said rack teeth, and thereby maintaining an interval between said rack and said pinion; and further comprising an elastic member mounted on said the holding member and biasing said rack in a direction away from said pinion.

4. An automatically opening/closing apparatus for vehicle, having a rack connected to an opening/closing member mounted on a vehicle and a drive source for rotate-driving a pinion engaged with rack teeth of said rack so as to automatically open/close said opening/closing member, the apparatus comprising:

a slide mechanism including a slide portion provided on a side of an axial-direction end of said rack and a guide member engaged with said slide portion and thereby supporting linearly reciprocably said rack;

a holding member contacting with a holding face of said rack, which is formed on a rear side with respect to said rack teeth, and thereby maintaining an interval between said rack and said pinion;

wherein a plurality of said holding members are each arranged along said holding face with a predetermined space; and further comprising an elastic member mounted on said the holding member and biasing said rack in a direction away from said pinion.

* * * * *